US008496333B2

(12) United States Patent
Wang et al.

(10) Patent No.: US 8,496,333 B2
(45) Date of Patent: Jul. 30, 2013

(54) ILLUMINATION MODULE HAVING WAVELENGTH CONVERSION UNIT, PROJECTION APPARATUS, AND LIGHT SOURCE CONTROL METHOD

(75) Inventors: Shen-Huei Wang, Hsin-Chu (TW); Tzu-Yi Yang, Hsin-Chu (TW); Po-Shan Song, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 241 days.

(21) Appl. No.: 13/083,613

(22) Filed: Apr. 11, 2011

(65) Prior Publication Data

US 2011/0261326 A1 Oct. 27, 2011

(30) Foreign Application Priority Data

Apr. 23, 2010 (CN) .......................... 2010 1 0166198

(51) Int. Cl.
  *G03B 21/14* (2006.01)
(52) U.S. Cl.
  USPC ............................................. 353/84; 353/94
(58) Field of Classification Search
  USPC ................. 353/84, 85, 94, 98, 30, 31, 32, 33, 353/34, 35, 36, 37, 81; 362/84, 293
  See application file for complete search history.

(56) References Cited

U.S. PATENT DOCUMENTS

| | | | |
|---|---|---|---|
| 4,697,227 A | 9/1987 | Callahan | |
| 6,084,235 A * | 7/2000 | Breithaupt et al. | 250/233 |
| 6,155,687 A * | 12/2000 | Peterson | 353/84 |
| 7,651,243 B2 | 1/2010 | McGuire, Jr. et al. | |
| 2002/0140910 A1* | 10/2002 | Stark et al. | 353/84 |
| 2003/0179347 A1* | 9/2003 | Tomiya | 353/39 |
| 2009/0268167 A1 | 10/2009 | Narikawa | |
| 2009/0284148 A1 | 11/2009 | Iwanaga | |
| 2010/0220298 A1* | 9/2010 | Wang et al. | 353/31 |
| 2010/0238412 A1* | 9/2010 | Kurosaki | 353/31 |
| 2011/0170073 A1* | 7/2011 | Hasegawa | 353/84 |
| 2011/0249242 A1* | 10/2011 | Saitou et al. | 353/98 |

FOREIGN PATENT DOCUMENTS

CN 101581410 11/2009

OTHER PUBLICATIONS

"First Office Action of China Counterpart Application" with English translation thereof, issued on Aug. 13, 2012, p. 1-p. 8.

* cited by examiner

*Primary Examiner* — Francis M Legasse, Jr.
*Assistant Examiner* — Bao-Luan Le
(74) *Attorney, Agent, or Firm* — Jianq Chyun IP Office

(57) ABSTRACT

An illumination module including a light emitting element, a wavelength conversion unit, a control unit, and a determining unit is provided. The light emitting element is capable of emitting an excitation light beam. The wavelength conversion unit is disposed on a transmission path of the excitation light beam for converting the excitation light beam into a color light beam. The control unit is connected to the wavelength conversion unit and capable of driving the wavelength conversion unit to rotate and to shift relative to the excitation light beam. The determining unit is electrically connected to the control unit. When the determining unit determines that a shifting condition is satisfied, the determining unit instructs the control unit to shift the wavelength conversion unit relative to the excitation light beam, so as to change the irradiation position of the excitation light beam on the wavelength conversion unit.

32 Claims, 10 Drawing Sheets

ILLUMINATION MODULE HAVING WAVELENGTH CONVERSION UNIT, PROJECTION APPARATUS, AND LIGHT SOURCE CONTROL METHOD

CROSS-REFERENCE TO RELATED APPLICATION

This application claims the priority benefit of China application serial no. 201010166198.2, filed Apr. 23, 2010. The entirety of the above-mentioned patent application is hereby incorporated by reference herein and made a part of this specification.

BACKGROUND OF THE INVENTION

1. Field of the Invention

The invention generally relates to an illumination module and a projection apparatus, and more particularly, to an illumination module improving illumination, a projection apparatus having the same, and a light source control method.

2. Description of Related Art

Besides such projection apparatus that provides color images by sequentially producing red, green, and blue light through an ultra high pressure (UHP) lamp (for emitting a white light) and a color wheel, a projection apparatus which uses red, green, and blue light emitting diodes (LEDs) as its light source has been provided along with the development of display technologies.

A projection apparatus uses LEDs as its light source, the light beams emitted by the red, green, and blue LEDs are combined by a light combination system, so that different color light beams along different transmission directions could be conducted to the same direction. The brightness of such a projection apparatus is determined by the brightness of the LEDs. In particular, the green LED is the major brightness contributor. Accordingly, the brightness of the entire projection apparatus is most limited by the light emission efficiency of the green LED. However, since an existing green LED has low light emission efficiency, it is not capable of being used as the light source of a high-brightness projection apparatus (for example, above 2000 ANSI lumens).

Several patents related to projection apparatuses have been disclosed. For example, an illumination device including a light source and a phosphor color wheel is disclosed in U.S. Pat. No. 7,651,243, wherein the light source sequentially irradiates the phosphor color wheel containing a plurality of blocks to produce light beams in different colors.

Additionally, a green light source device producing green light by irradiating a green phosphor plate with an excitation light source is disclosed in U.S. publication No. 20090268167. Moreover, a technique of sequentially exciting phosphor powder on a light transparent substrate by using an excitation light beam so as to sequentially produce red and green light is disclosed in U.S. publication No. 20090284148.

SUMMARY OF THE INVENTION

Accordingly, the invention is directed to an illumination module providing improved illumination.

The invention is directed to a projection apparatus providing images with improved illumination.

The invention is directed to a light source control method providing improved illumination.

Other advantages and objects of the invention may be further comprehended through the technical features disclosed in the invention.

In order to achieve one or part of or all the objectives or other objectives, an illumination module is provided in an embodiment of the invention. The illumination module includes a first light emitting element, a wavelength conversion unit, a control unit, and a determination unit. The first light emitting element is capable of emitting an excitation light beam. The wavelength conversion unit is disposed on a transmission path of the excitation light beam for converting the excitation light beam into a first color light beam, wherein a wavelength of the first color light beam is different from a wavelength of the excitation light beam. The control unit is connected to the wavelength conversion unit. The control unit is capable of driving the wavelength conversion unit to rotate and shift relative to the excitation light beam. The determination unit is electrically connected to the control unit. When the determination unit determines that a shifting condition is satisfied, the determination unit instructs the control unit to shift the wavelength conversion unit relative to the excitation light beam, so as to change an irradiation position of the excitation light beam on the wavelength conversion unit.

According to an embodiment of the invention, a projection apparatus including an illumination module, a light valve, and a projection lens is provided. The illumination module includes aforementioned first light emitting element, the wavelength conversion unit, the control unit, the determining unit, a second light emitting element, and a light combination element. The second light emitting element is capable of emitting a second color light beam. The light combination element is disposed on the transmission paths of the first color light beam and the second color light beam for combining the first color light beam and the second color light beam. The light valve is disposed on the transmission paths of the first color light beam and the second color light beam. The projection lens is disposed on the transmission paths of the first color light beam and the second color light beam coming from the light valve.

According to an embodiment of the invention, a light source control method including following steps is provided. First, an excitation light beam is converted into a first color light beam by a wavelength conversion unit, wherein the wavelength of the first color light beam is different from the wavelength of the excitation light beam. Then, the wavelength conversion unit is rotated relative to the excitation light beam. Next, when a shifting condition is satisfied, the wavelength conversion unit is shifted relative to the excitation light beam to change the irradiation position of the excitation light beam on the wavelength conversion unit.

As described above, an embodiment of the invention could achieve at least one of following advantages or effects. In an embodiment of the invention, an excitation light beam is converted into a first color light beam by a wavelength conversion unit through excitation, so that an intensive first color light beam may be generated. Additionally, in an embodiment of the invention, because a rotatable wavelength conversion unit is adopted and the wavelength conversion unit is shifted relative to an excitation light beam, the excitation light beam irradiates at different positions on the wavelength conversion unit at different time, so that the excitation light beam won't irradiate the same area all the time and accordingly damage caused by heat accumulation is avoided. Thereby, a first light beam with stable light intensity is produced and the performance of the projection apparatus is improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
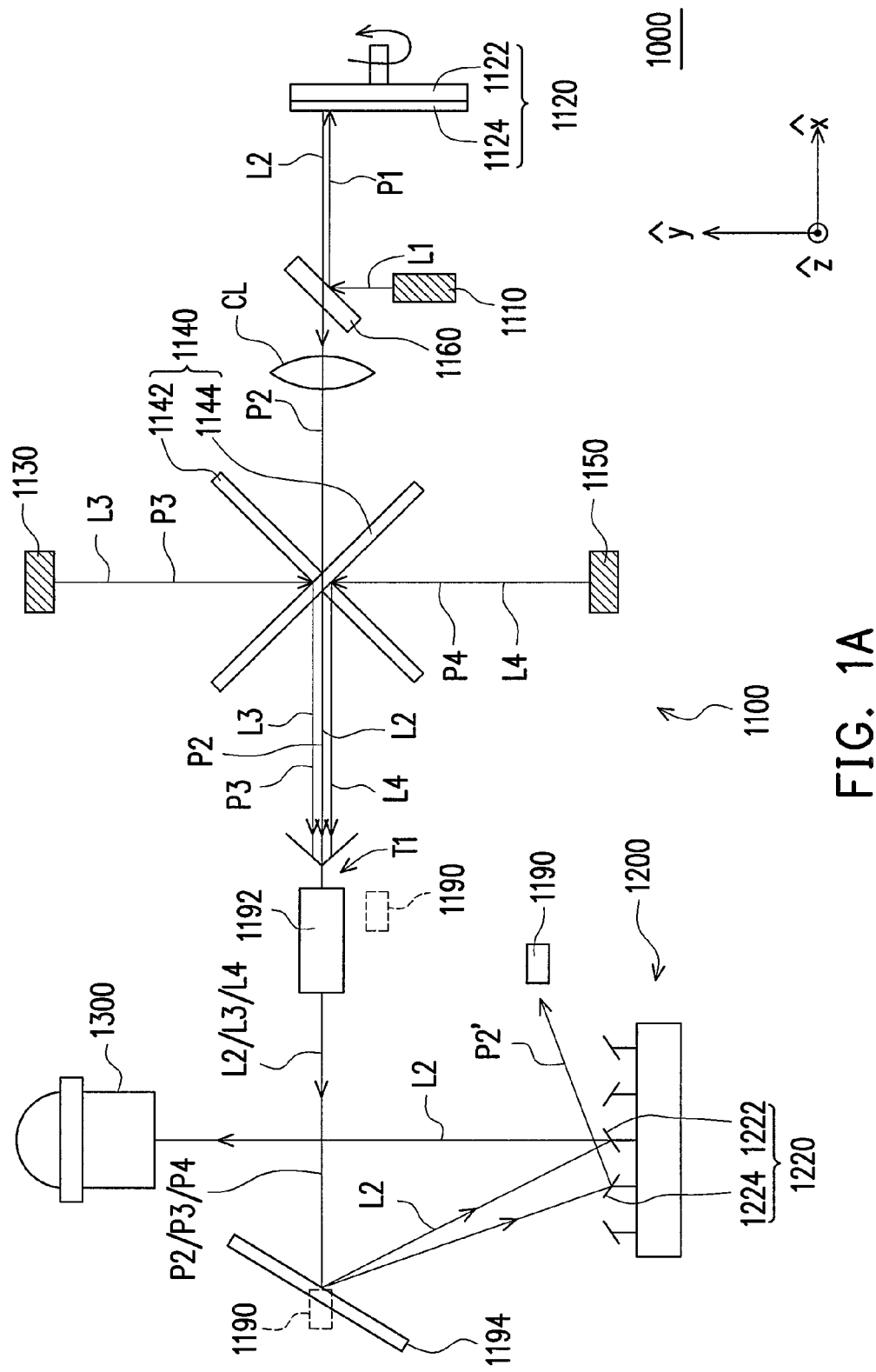
FIG. 1A is a light path diagram of a projection apparatus according to a first embodiment of the invention.
Figure 1B:
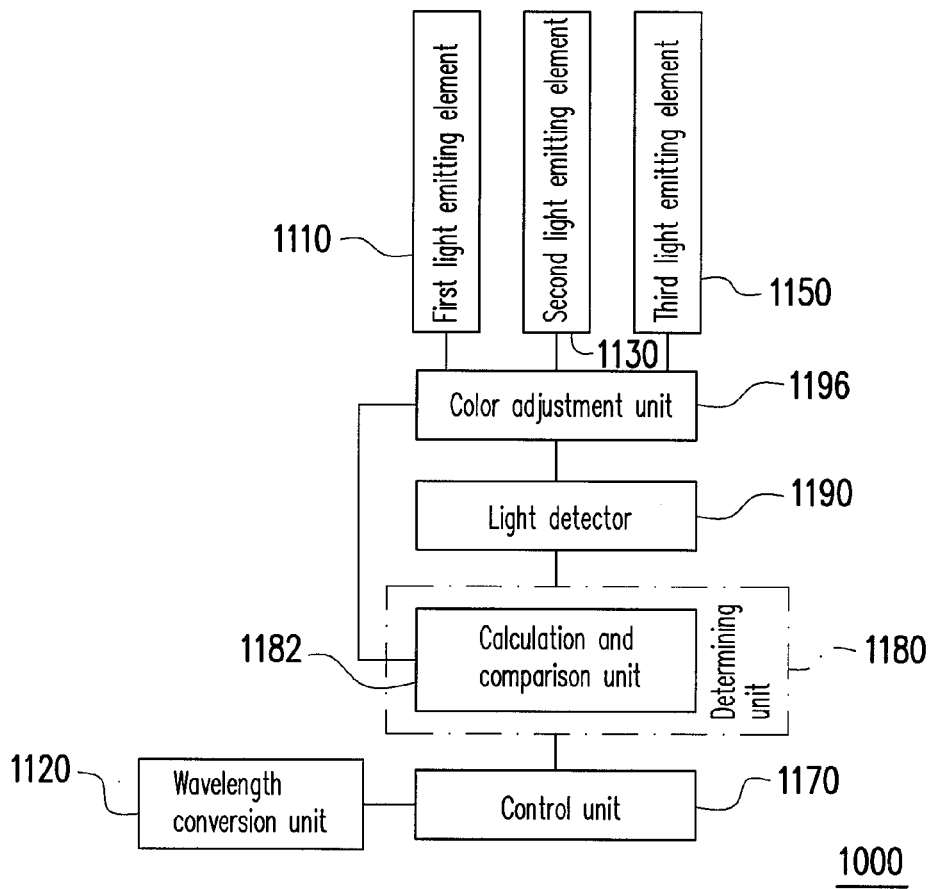
FIG. 1B is a block diagram of the projection apparatus according to the first embodiment of the invention.

FIG. 1A is a light path diagram of a projection apparatus 1000 according to the first embodiment of the invention. FIG. 1B is a block diagram of the projection apparatus 1000 according to the first embodiment of the invention. Referring to both FIG. 1A and FIG. 1B, the projection apparatus 1000 in the present embodiment includes an illumination module 1100, a light valve 1200, and a projection lens 1300. The illumination module 1100 includes a first light emitting element 1110, a wavelength conversion unit 1120, a second light emitting element 1130, a light combination element 1140, a control unit 1170, and a determining unit 1180.

As shown in FIG. 1A, the first light emitting element 1110 is capable of emitting an excitation light beam L1, wherein the first light emitting element 1110 may be a laser light source. In the present embodiment, the first light emitting element 1110 may be a blue solid-state laser or an ultraviolet (UV) laser, and the wavelength of the excitation light beam L1 falls between 350 nm and 450 nm. However, in another embodiment, the first light emitting element 1110 may also be a light emitting diode (LED) or other suitable light sources.

The wavelength conversion unit 1120 is disposed on the transmission path P1 of the excitation light beam L1 for converting the excitation light beam L1 into a first color light beam L2, wherein the first color light beam L2 and the excitation light beam L1 have different wavelengths. The wavelength conversion unit 1120 in the present embodiment includes a phosphor layer 1124. The excitation light beam L1 is capable of exciting the phosphor layer 1124 to allow the phosphor layer 1124 to emit the first color light beam L2. In the present embodiment, the first color light beam L2 may be green light, and the wavelength of the first color light beam L2 falls between 520 nm and 560 nm. It should be noted that the wavelength of the first color light beam L2 is not limited thereto. In other words, in other embodiments, the first color light beam L2 may also be blue or red light. In addition, the wavelength conversion unit 1120 further includes a reflection mirror 1122, and the phosphor layer 1124 is disposed on the reflection mirror 1122. Moreover, the phosphor layer 1124 may be phosphor powder coated over the reflection mirror 1122.

In the present embodiment, the wavelength conversion unit 1120 transmits the first color light beam L2 to the light combination element 1140. When the excitation light beam L1 reaches the wavelength conversion unit 1120, particles in the phosphor layer 1124 are excited so that the first color light beam L2 is emitted.

Figure 1C:
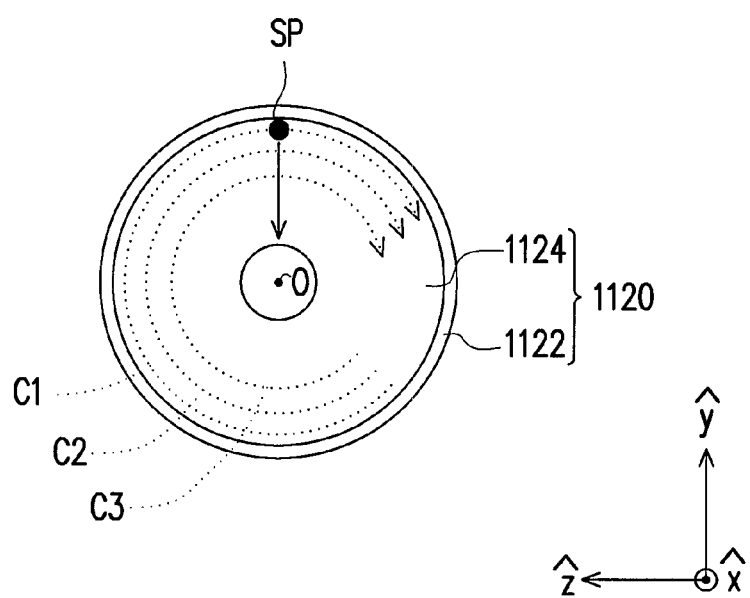
FIG. 1C is a diagram of a wavelength conversion unit in FIG. 1A viewed along a +x direction.

FIG. 1C is a diagram of the wavelength conversion unit 1120 in FIG. 1A viewed along the +x direction. Referring to FIG. 1C, in the present embodiment, the reflection mirror 1122 is in a circular shape. In other embodiments, the reflection mirror 1122 may also be in other shapes. The phosphor layer 1124 is evenly coated over the reflection mirror 1122 and may contain any material. The wavelength conversion unit 1120 in the present embodiment could produce red, green, and blue light beams or light beams of other wavelengths desired by the projection apparatus 1000 with different excitation light beam L1.

The wavelength conversion unit 1120 is capable of rotating around a rotation center O to make a speckle SP of the excitation light beam L1 to irradiate different positions on the track C1 of the wavelength conversion unit 1120 at different time points, so that heat accumulation caused by long-time irradiation of the excitation light beam L1 at the same area on the wavelength conversion unit 1120 is avoided.

On the other hand, assuming that the irradiation track of the initial excitation light beam L1 is the track C1, such that only the outmost phosphor layer 1124 is excited to produce the first color light beam L2. In the present embodiment, in order to prevent light intensity attenuation of the first color light beam L2 caused by heat accumulation, long working time of the irradiated phosphor layer 1124, or other factors, as shown in FIG. 1A and FIG. 1C, the wavelength conversion unit 1120 is capable of shifting relative to the excitation light beam L1 to change the distance from the irradiation position of the excitation light beam L1 on the wavelength conversion unit 1120 to the rotation center O of the wavelength conversion unit 1120. It should be noted that in the present embodiment, the relative shifting refers to that the wavelength conversion unit 1120 is moved in the illumination module 1100 while the first light emitting element 1110 is not moved, or the first light emitting element 1110 is moved in the illumination module 1100 while the wavelength conversion unit 1120 is not moved.

To be specific, the irradiation track of the excitation light beam L1 could be moved towards the inside of the wavelength conversion unit 1120 (i.e., the irradiation track of the excitation light beam L1 is changed from the track C1 to the track C2) by moving the excitation light beam L1 or the wavelength conversion unit 1120. Accordingly, the irradiated area of the phosphor layer 1124 is renewed continuously so that the excitation light beam L1 won't irradiate the same area on the wavelength conversion unit 1120 for very long time and no heat accumulation will be produced to damage the phosphor layer 1124 or affect the subsequent conversion of the first color light beam L2. In other words, by rotating the wavelength conversion unit 1120 and shifting the wavelength conversion unit 1120 relative to the excitation light beam L1, heat produced inside the projection apparatus 1000 could be effectively dissipated so that the light emission efficiency of the phosphor layer 1124 is improved and the brightness and color reliability of the projection apparatus 1000 are also improved. The mechanism for shifting the wavelength conversion unit 1120 in the projection apparatus 1000 will be described in detail later.

Referring to FIG. 1A again, the second light emitting element 1130 in the present embodiment is capable of emitting a second color light beam L3, wherein the first color light beam L2 and the second color light beam L3 have different colors. In the present embodiment, the first color light beam L2 and the second color light beam L3 are respectively in green and red color, and the second light emitting element 1130 may be a light emitting diode (LED). The light combination element 1140 is disposed on the transmission paths P2 and P3 of the first color light beam L2 and the second color light beam L3 for combining the transmission paths P2 and P3 of the first color light beam L2 and the second color light beam L3. The light valve 1200 is disposed on the transmission paths P2 and P3 of the first color light beam L2 and the second color light beam L3.

The projection apparatus 1000 in the present embodiment further includes a third light emitting element 1150, wherein the third light emitting element 1150 may be a LED. The third light emitting element 1150 is capable of emitting a third color light beam L4, and the third color light beam L4, the first color light beam L2, and the second color light beam L3 have different colors. In the present embodiment, the third color light beam L4 may be in blue color. As shown in FIG. 1A, the light combination element 1140 is disposed on the transmission path P4 of the third color light beam L4 for combining the transmission paths of the first color light beam L2, the second color light beam L3, and the third color light beam L4. In the present embodiment, the second color light beam L3 and the third color light beam L4 are respectively in red and blue color. However, in another embodiment, the second color light beam L3 and the third color light beam L4 may also be respectively in blue and red color. A color image is produced when light beams in different colors pass through the light valve 1200. The projection lens 1300 is disposed on the transmission paths P2 and P3 of the first color light beam L2 and the second color light beam L3 coming from the light valve 1200.

Moreover, in the present embodiment, the third color light beam L4, the first color light beam L2, and the second color light beam L3 sequentially pass through the light combination element 1140 to reach the light valve 1200. In another embodiment, the third color light beam L4, the first color light beam L2, and the second color light beam L3 may also simultaneously pass through the light combination element 1140 and irradiate the light valve 1200 to produce a color light source.

In the present embodiment, the light valve 1200 may be a digital micro-mirror device (DMD). As shown in FIG. 1A, the DMD 1200 includes a plurality of micro reflection mirrors 1220. Each of the micro reflection mirrors 1220 is capable of swinging to an on-state and an off-state. When a micro reflection mirror 1220 (for example, a micro reflection mirror 1222) swings to the on-state, the micro reflection mirror 1222 reflects the first color light beam L2 radiated onto the micro reflection mirror 1222 to the projection lens 1300. On the other hand, when a micro reflection mirror 1220 (for example, a micro reflection mirror 1224) swings to the off-state, the micro reflection mirror 1224 reflects the first color light beam L2 radiated onto the micro reflection mirror 1224 to a direction deviating from the projection lens 1300.

The projection apparatus 1000 in the present embodiment further includes a light detector 1190. The light detector 1190 is disposed on the transmission path P2 of the first color light beam L2 for detecting the first color light beam L2. To be specific, in the present embodiment, the light detector 1190 is disposed on the transmission path P2' of the first color light beam L2 reflected by the micro reflection mirror 1224 when the micro reflection mirror 1224 is in the off-state.

As shown in FIG. 1A, in the present embodiment, the projection apparatus 1000 further includes a light uniformization element 1192. In the present embodiment, the light uniformization element 1192 may be a light integration rod. However, in another embodiment, the light uniformization element 1192 may also be a lens array. In the present embodiment, the light uniformization element 1192 is disposed between the light combination element 1140 and the light valve 1200 for uniformizing the first color light beam L2, the second color light beam L3, and the third color light beam L4. In another embodiment, the light detector 1190 may also be disposed beside the light uniformization element 1192 and around a light incident end T1 of the light integration rod 1192 for detecting stray light (not shown) produced by the first color light beam L2.

The projection apparatus 1000 in the present embodiment further includes a reflection mirror 1194. The reflection mirror 1194 is disposed between the light combination element 1140 and the light valve 1200 for reflecting the first color light beam L2 from the light combination element 1140 to the light valve 1200. In another embodiment, the light detector 1190 may also be disposed around the reflection mirror 1194 for detecting stray light (not shown) produced by the first color light beam L2. It should be noted that in other embodiments, the projection apparatus 1000 may not include the reflection mirror 1194. Namely, the disposition of the reflection mirror 1194 could be adjusted according to the optical design. As described above, in an embodiment of the invention, the light detector 1190 could be selectively disposed on the transmission path P2' of the first color light beam L2, around the light incident end T1 of the light uniformization element 1192, or around the reflection mirror 1194 according to the actual requirement for detecting the first color light beam L2.

Referring to both FIG. 1A and FIG. 1B, in the present embodiment, the control unit 1170 is connected to the wavelength conversion unit 1120. The control unit 1170 is capable of driving the wavelength conversion unit 1120 to rotate and driving the wavelength conversion unit 1120 to shift relative to the excitation light beam L1 (as shown in FIG. 1C).

The determining unit 1180 is electrically connected to the control unit 1170. In the present embodiment, when the determining unit 1180 determines that a shifting condition is satisfied, the determining unit 1180 instructs the control unit 1170 to shift the wavelength conversion unit 1120 relative to the excitation light beam L1 so as to change the irradiation position of the excitation light beam L1 on the wavelength conversion unit 1120 (as shown in FIG. 1C). Herein the shifting condition may include that a predetermined time is arrived, a shifting instruction is input, or the variation of a parameter of the first color light beam L2 reaches a predetermined extent. In FIG. 1B, it is taken as an example that the variation of the parameter of the first color light beam L2 reaches the predetermined extent.

On the other hand, in the present embodiment, the determining unit 1180 includes a calculation and comparison unit 1182. The calculation and comparison unit 1182 is electrically connected to the light detector 1190 and the control unit 1170. As shown in FIG. 1A, the light detector 1190 is disposed on the transmission path P2 or P2' of the first color light beam L2 for detecting the first color light beam L2. The calculation and comparison unit 1182 calculates the parameter of the first color light beam L2 captured from the light detector 1190 and determines whether the variation of the parameter reaches the predetermined extent. If the variation of the parameter reaches the predetermined extent, the calculation and comparison unit 1182 instructs the control unit 1170 to shift the wavelength conversion unit 1120 relative to the excitation light beam L1. In the present embodiment, the light detector 1190 may also be disposed on the transmission paths of the second color light beam L3 and the third color light beam L4 for detecting the second color light beam L3 and the third color light beam L4. Aforementioned parameter may be the light intensity of the first color light beam L2 or the proportion of the light intensity of the first color light beam L2 to the light intensity of the second color light beam L3 and the light intensity of the third color light beam L4.

For example, the light detector 1190 detects the light intensities of the first color light beam L2, the second color light beam L3, or the third color light beam L4 in the projection apparatus 1000 such that the calculation and comparison unit 1182 could determine the variation of the light source accordingly. After the projection apparatus 1000 is just manufactured, the light detector 1190 is calibrated by the manufacturer. When subsequently the projection apparatus 1000 is in operation, the light detector 1190 keeps detecting the light intensities of the first color light beam L2, the second color light beam L3, or the third color light beam L4 so as to allow the calculation and comparison unit 1182 to determine whether the current projection color or brightness is appropriate.

As described above, after the projection apparatus 1000 is used by a user for a while, the light intensity attenuation of the phosphor layer 1124 may cause the projection color (for example, the color coordinate or color temperature of a white image) to deviate from the specified value or even go out of balance. When the calculation and comparison unit 1182 determines that the variation of the parameter of the first color light beam L2 reaches the predetermined extent (for example, decrease on the light intensity of the first color light beam L2 reaches the predetermined extent), the calculation and comparison unit 1182 instructs the control unit 1170 to shift the wavelength conversion unit 1120 relative to the excitation light beam L1, so as to change the irradiation position of the excitation light beam L1 on the wavelength conversion unit 1120. Namely, as shown in FIG. 1C, the irradiation track of the excitation light beam L1 is changed from the track C1 to the track C2. Because the track C2 is not irritated by the excitation light beam L1 when the excitation light beam L1 irradiates the track C1, the phosphor powder is not consumed so that the excitation light beam L1 irradiates the track C2 to emit a first color light beam L2 with appropriate intensity and the projection apparatus 1000 resumes an appropriate color balance state.

Additionally, the projection apparatus 1000 in the present embodiment may further include a color adjustment unit 1196. The color adjustment unit 1196 is electrically connected to the first light emitting element 1110, the second light emitting element 1130, the third light emitting element 1150, the light detector 1190, and the determining unit 1180. When the determining unit 1180 instructs the control unit 1170 to shift the wavelength conversion unit 1120 and the color adjustment unit 1196 determines that the proportion of the light intensities of the first color light beam L2, the second color light beam L3, and the third color light beam L4 detected by the light detector 1190 exceeds a predetermined range, the color adjustment unit 1196 adjusts the light intensities of the first color light beam L2, the second color light beam L3, and the third color light beam L4 to make a proportion of the light intensities of the first color light beam L2, the second color light beam L3, and the third color light beam L4 to fall within the predetermined range.

On the other hand, referring to FIG. 1A, the projection apparatus 1000 in the present embodiment further includes a third dichroic unit 1160, wherein the third dichroic unit 1160 may be a dichroic mirror. The third dichroic unit 1160 is disposed on the transmission path P1 of the excitation light beam L1 between the first light emitting element 1110 and the wavelength conversion unit 1120 and the transmission path P2 of the first color light beam L2 between the wavelength conversion unit 1120 and the light combination element 1140. The third dichroic unit 1160 is capable of transmitting the excitation light beam L1 to the wavelength conversion unit 1120 and transmitting the first color light beam L2 to the light combination element 1140. Besides, in the present embodiment, the projection apparatus 1000 further includes a collimator CL. The collimator CL is capable of emitting the first color light beam L2 in parallel. In the present embodiment, the collimator CL is a collimating lens. In other embodiments, the relative movement between the wavelength conversion unit 1120 and the excitation light beam L1 may also be accomplished by rotating or moving the third dichroic unit 1160 but keeping the wavelength conversion unit 1120 and the first light emitting element 1110 still.

When the excitation light beam L1 is reflected by the third dichroic unit 1160 to the phosphor layer 1124 to produce the first color light beam L2 (for example, a green phosphor light), the first color light beam L2 is reflected by the reflection mirror 1122. Then, the first color light beam L2 passes through the third dichroic unit 1160 and the light combination element 1140. The first color light beam L2 is combined with the second color light beam L3 and the third color light beam L4 into a broadband light beam required by the projection apparatus 1000. Because the three color light sources required by the projection apparatus 1000 are each a broader unicolor light source, the speckle effect produced by a laser projector is effectively avoided and accordingly the projection quality is improved. Additionally, as shown in FIG. 1A, the excitation light beam L1 enters the wavelength conversion unit 1120 perpendicularly. However, in other embodiments, the first light emitting element 1110 may also be placed in an inclined way so that the excitation light beam L1 enters the wavelength conversion unit 1120 obliquely. In this case, the third dichroic unit 1160 may not be adopted in the projection apparatus 1000.

On the other hand, since no green LED is disposed in the projection apparatus 1000 for producing green light beam, and instead, the shortwave excitation light beam L1 (for example, a laser beam) is used for exciting the first color light beam L2 (for example, a green phosphor light), the projection apparatus 1000 in the present embodiment is not limited by the current development state of LED light source and could have improved brightness. For example, in the present embodiment, the first color light beam L2 produces a brightness of about 5000-6000 lumens, which is much higher than that produced by an existing green LED for now. In addition, the wavelength conversion unit 1120 capable of rotating and shifting helps to dissipate heat produced in the projection apparatus 1000 so that the volume of the projection apparatus 1000 for heat dissipation could be reduced. Moreover, because the spectrum of the first color light beam L2 is similar to that of an existing green LED, the projection apparatus 1000 could produce a color gamut similar to that produced by an existing projection apparatus. Furthermore, by coating the phosphor layer 1124 over the reflection mirror 1122, the emission of the first color light beam L2 could be restricted to a single side, the light reception efficiency of the projection apparatus 1000 could be improved, and the complexity in the optical design of the projection apparatus 1000 could be reduced.

Referring to FIG. 1A again, the light combination element 1140 in the present embodiment includes a first dichroic unit 1142 and a second dichroic unit 1144, wherein the first dichroic unit 1142 and the second dichroic unit 1144 may be dichroic mirrors. The first dichroic unit 1142 is disposed on the transmission paths P2, P3, and P4 of the first color light beam L2, the second color light beam L3, and the third color light beam L4. The first dichroic unit 1142 is capable of reflecting one of the first color light beam L2 and the second color light beam L3 and allowing the other one of the first color light beam L2 and the second color light beam L3 to pass through. To be specific, in the present embodiment, the first dichroic unit 1142 is capable of reflecting the second color light beam L3 and allowing the first color light beam L2 to pass through.

As shown in FIG. 1A, the second dichroic unit 1144 and the first dichroic unit 1142 are disposed crossing each other, and the second dichroic unit 1144 is disposed on the transmission paths of the first color light beam L2, the second color light beam L3, and the third color light beam L4. The second dichroic unit 1144 is capable of reflecting the third color light beam L4 and allowing the first color light beam L2 and the second color light beam L3 to pass through, so that the transmission paths P2, P3, and P4 of the first color light beam L2, the second color light beam L3, and the third color light beam L4 are combined.

Figure 1D:
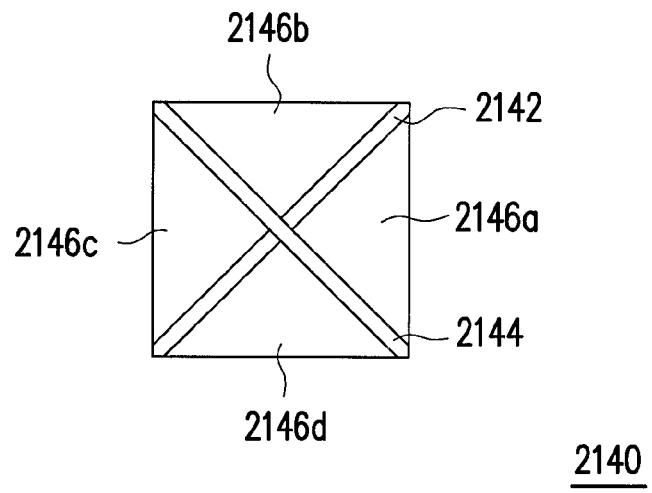
FIG. 1D is a diagram of a light combination element according to another embodiment of the invention.

FIG. 1D is a diagram of a light combination element according to another embodiment of the invention. Referring to FIG. 1D, the light combination element 2140 includes a first dichroic unit 2142, a second dichroic unit 2144, and prisms 2146a-2146d, wherein the first dichroic unit 2142 and the second dichroic unit 2144 are disposed crossing each other and may be dichroic films. A part of the first dichroic unit 2142 is located at the intersection between the prism 2146a and the prism 2146b, and another part of the first dichroic unit 2142 is located at the intersection between the prism 2146c and the prism 2146d. A part of the second dichroic unit 2144 is located at the intersection between the prism 2146b and the prism 2146c, and another part of the second dichroic unit 2144 is located at the intersection between the prism 2146a and the prism 2146d. The light combination element 2140 has the same function as the light combination element 1140, and the function of the light combination element 1140 could be referred to foregoing description. Thus, the function of the light combination element 2140 will not be described herein.

Second Embodiment

Figure 2:
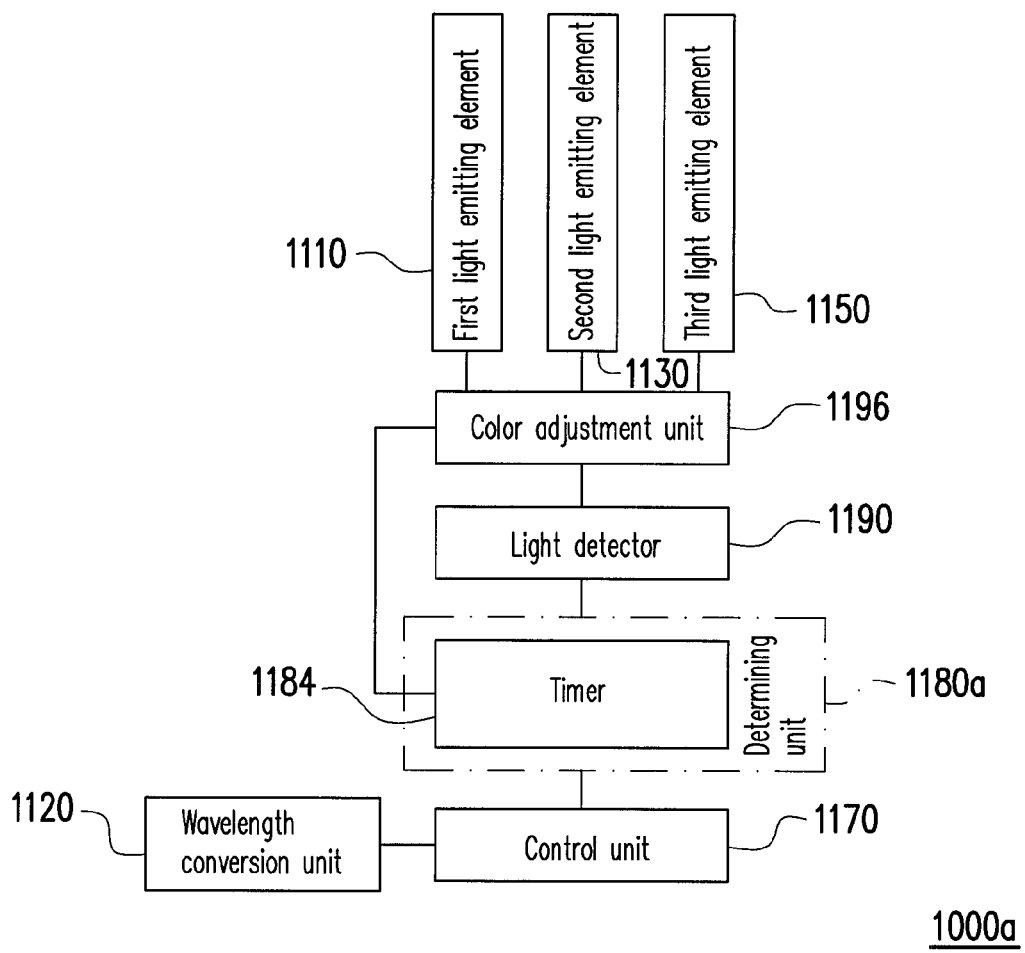
FIG. 2 is a block diagram of a projection apparatus according to a second embodiment of the invention.

FIG. 2 is a block diagram of a projection apparatus 1000a according to the second embodiment of the invention. The projection apparatus 1000a in FIG. 2 is similar to the projection apparatus 1000 in FIG. 1B, and the major difference between the two is that the determining unit 1180a further includes a timer 1184. The timer 1184 is electrically connected to the control unit 1170. The timer 1184 calculates the working time of the wavelength conversion unit 1120, and when the working time of the wavelength conversion unit 1120 reaches a predetermined time, the timer 1184 instructs the control unit 1170 to shift the wavelength conversion unit 1120 relative to the excitation light beam L1 (as shown in FIG. 1A).

Referring to both FIG. 1A and FIG. 2, in other words, after the projection apparatus 1000a is used for a predetermined time, the timer 1184 instructs the wavelength conversion unit 1120 to shift relative to the excitation light beam L1 so as to automatically change the irradiated area on the phosphor layer 1124 and produce a first color light beam L2 with a stable light intensity. The mechanism for shifting the wavelength conversion unit 1120 could be referred to the embodiment illustrated in FIGS. 1A-1C therefore will not be described herein.

On the other hand, similar to that in the first embodiment, the color adjustment unit 1196 determines the current color balance state according to a feedback value received from the light detector 1190 and accordingly tunes the first light emitting element 1110, the second light emitting element 1130, and the third light emitting element 1150, so as to change the proportion between the light intensities of the first color light beam L2, the second color light beam L3, and the third color light beam L4 and allow the projection apparatus 1000a to resume an appropriate color balance state.

Third Embodiment

Figure 3:
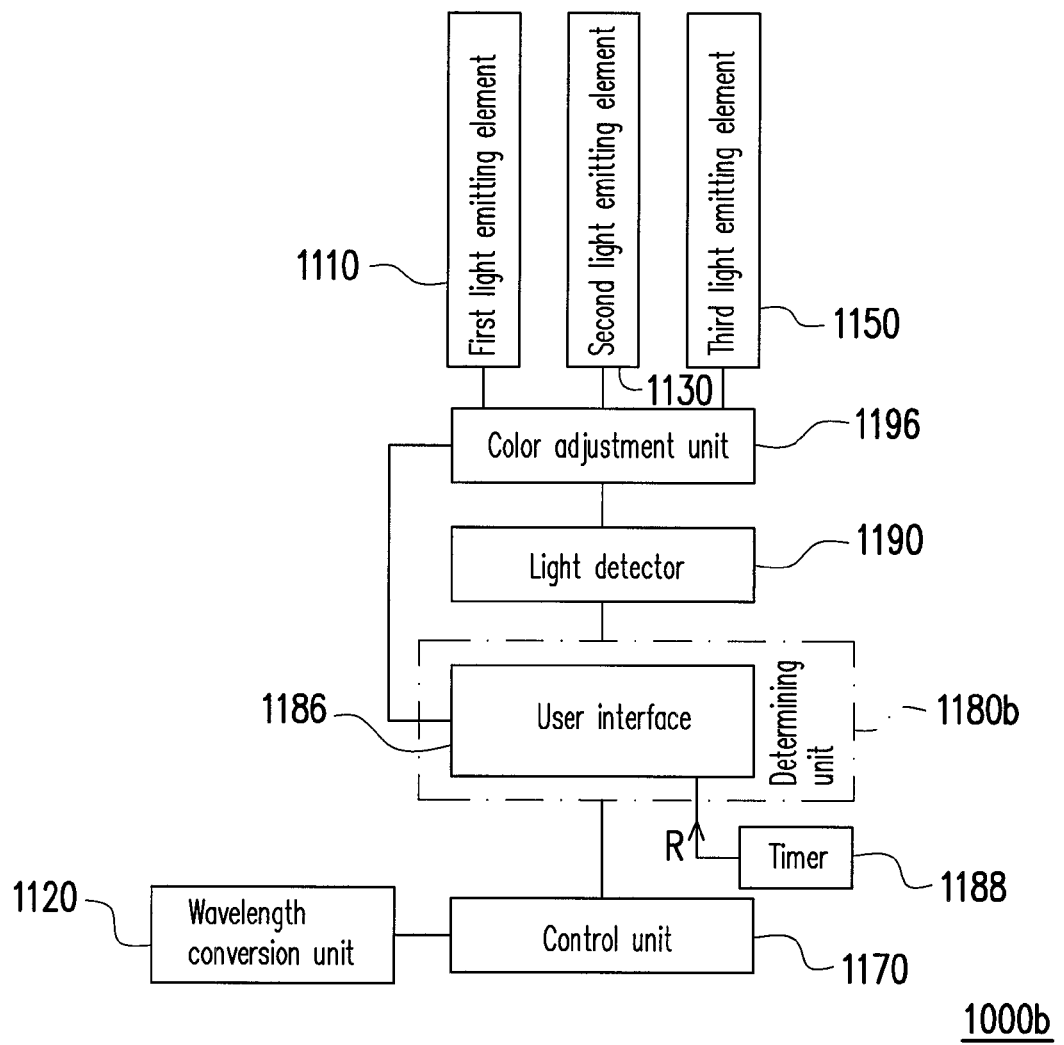
FIG. 3 is a block diagram of a projection apparatus according to a third embodiment of the invention.

FIG. 3 is a block diagram of a projection apparatus 1000b according to a third embodiment of the invention. The projection apparatus 1000b in FIG. 3 is similar to the projection apparatus 1000 in FIG. 1B, and the major difference between the two is that the determining unit 1180b further includes a user interface 1186. The user interface 1186 is electrically connected to the control unit 1170. When a shifting instruction is input into the user interface 1186, the user interface 1186 instructs the control unit 1170 to shift the wavelength conversion unit 1120 relative to the excitation light beam L1 (as shown in FIG. 1A).

Referring to both FIG. 1A and FIG. 3, to be specific, when a user senses that an image is losing its color balance, the user may input a shifting instruction by pressing down a correction button (not shown) on the user interface 1186 or through the operation of a touch screen, a voice control, a remote control, or through other operations. Accordingly, the control unit 1170 drives the wavelength conversion unit 1120 to shift relative to the excitation light beam L1 so as to change the irradiated area on the phosphor layer 1124 and produce a stable first color light beam L2.

In addition, the projection apparatus 1000b in the present embodiment further includes a timer 1188. The timer 1188 is coupled to the user interface 1186. The timer 1188 calculates the working time of the wavelength conversion unit 1120, and when the working time of the wavelength conversion unit 1120 reaches a predetermined time, the timer 1188 notifies the user to input a shifting instruction by issuing a notification instruction R to the user interface 1186 or by projecting onto a screen, so as to allow the control unit 1170 to shift the wavelength conversion unit 1120 relative to the excitation light beam L1, so that the irradiated area on the phosphor layer 1124 is changed and a stable first color light beam L2 is produced.

The mechanism for shifting the wavelength conversion unit 1120 could be referred to the embodiment illustrated in FIGS. 1A-1C therefore will not be described herein.

On the other hand, similar to that in the first embodiment, the color adjustment unit 1196 determines the current color balance state according to a feedback value received from the light detector 1190 and accordingly tunes the first light emitting element 1110, the second light emitting element 1130, and the third light emitting element 1150, so as to change the proportion between the light intensities of the first color light beam L2, the second color light beam L3, and the third color light beam L4 and allow the projection apparatus 1000b to resume an appropriate color balance state.

Fourth Embodiment

Figure 4:
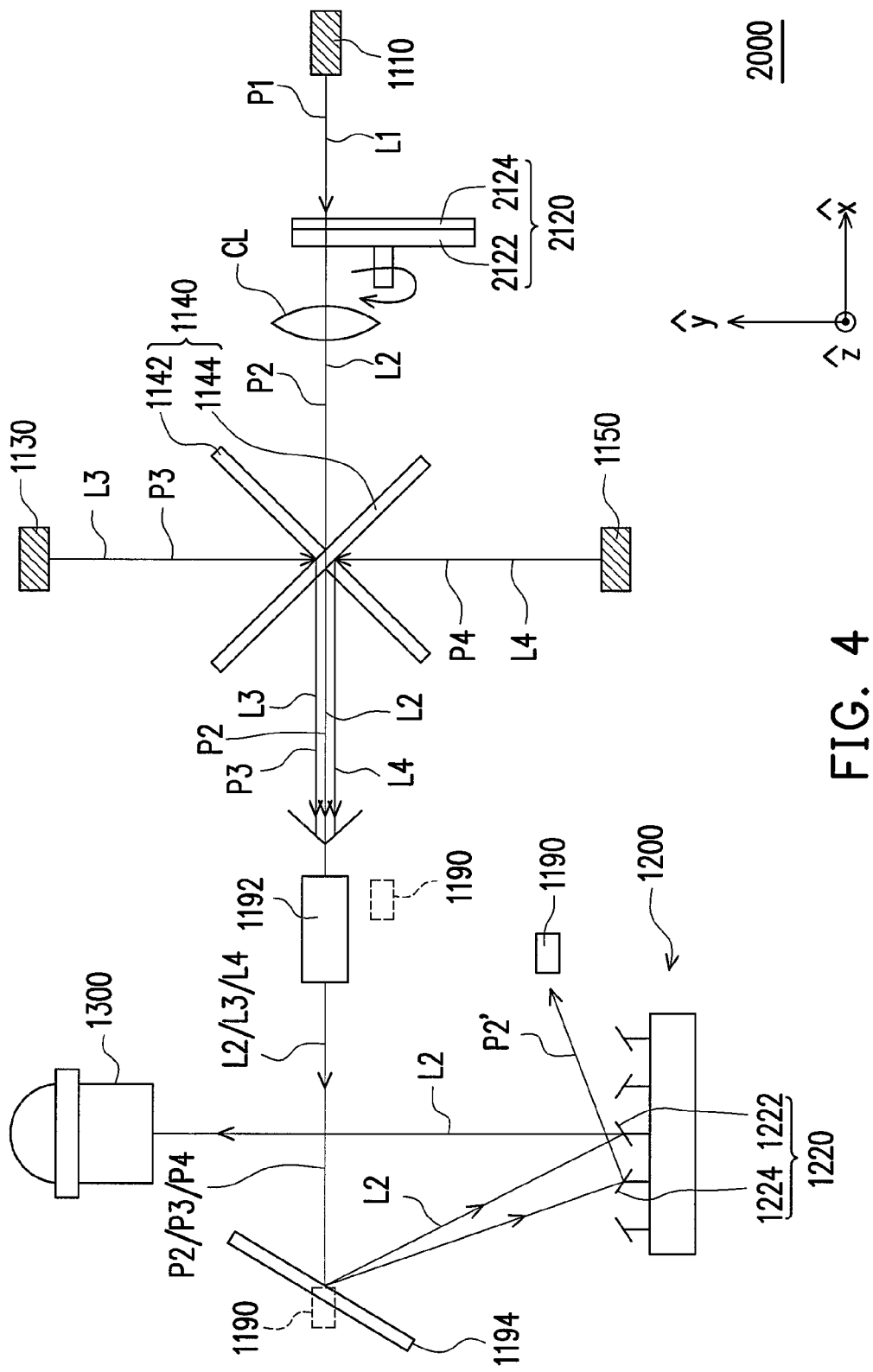
FIG. 4 is a light path diagram of a projection apparatus according to a fourth embodiment of the invention.

FIG. 4 is a light path diagram of a projection apparatus 2000 according to the fourth embodiment of the invention. The projection apparatus 2000 in the present embodiment is similar to the projection apparatus 1000 in FIG. 1A, and the major difference between the two is that the projection apparatus 2000 does not have the third dichroic unit 1160 in the projection apparatus 1000. Instead, in the present embodiment, the excitation light beam L1 is directly converted into the first color light beam L2 by the wavelength conversion unit 2120. To be specific, the wavelength conversion unit 2120 includes a light transparent substrate 2122 and a phosphor layer 2124. The phosphor layer 2124 is disposed on the light transparent substrate 2122 and located between the light transparent substrate 2122 and the first light emitting element 1110. When the excitation light beam L1 reaches the wavelength conversion unit 2120, particles in the phosphor layer 2124 are excited so that the first color light beam L2 is emitted, wherein the first color light beam L2 may be in green color. In another embodiment, the light transparent substrate 2122 may also be located between the phosphor layer 2124 and the first light emitting element 1110.

In the present embodiment, the excitation light beam L1 perpendicularly enters the wavelength conversion unit 2120. However, in another embodiment, the first light emitting element 1110 may also be placed in an inclined way so that the excitation light beam L1 obliquely enters the wavelength conversion unit 2120.

Fifth Embodiment

Figure 5:
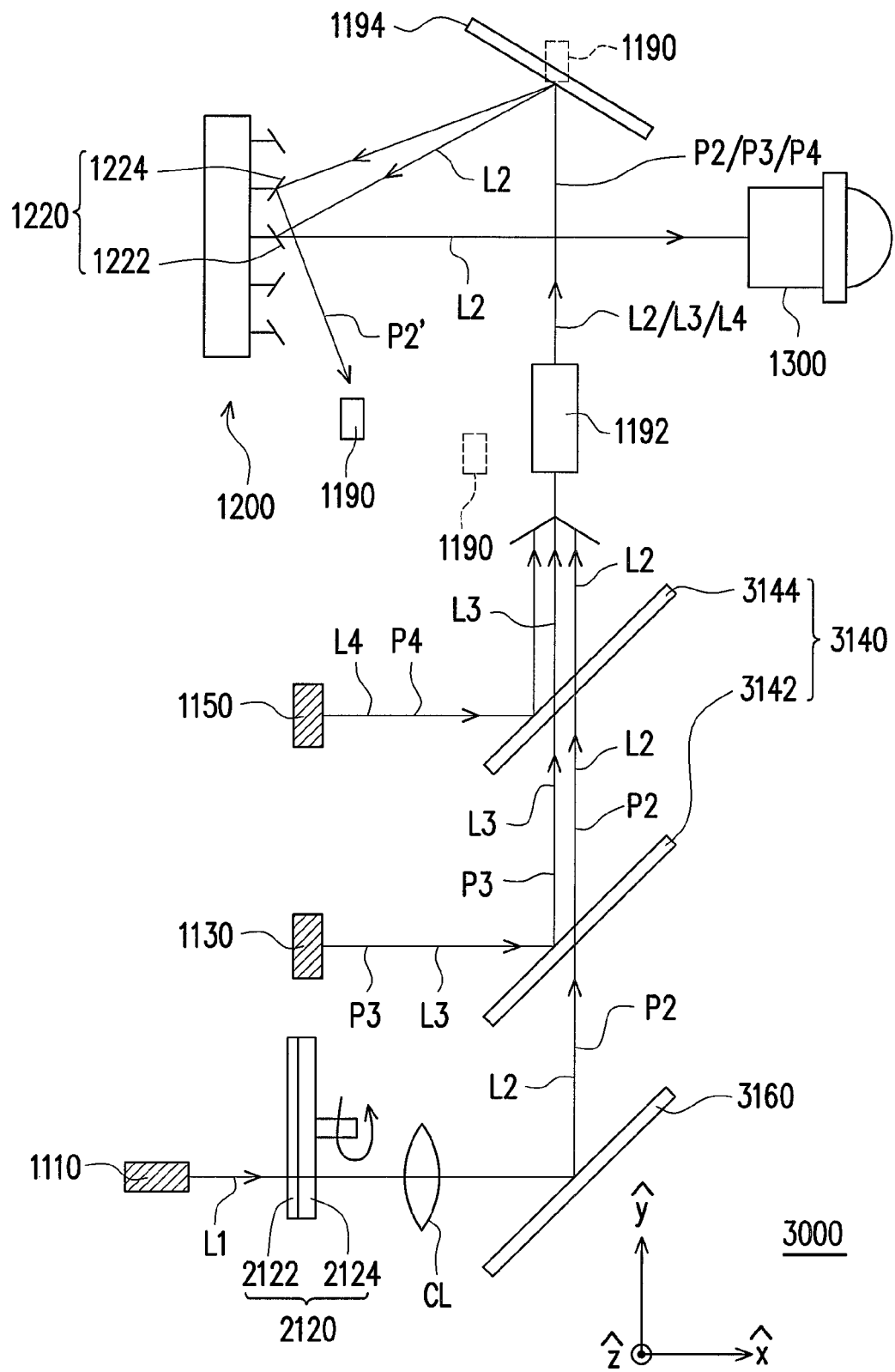
FIG. 5 is a light path diagram of a projection apparatus according to a fifth embodiment of the invention.

FIG. 5 is a light path diagram of a projection apparatus 3000 according to the fifth embodiment of the invention. The projection apparatus 3000 in the present embodiment is similar to the projection apparatus 2000 in FIG. 4, and the major difference between the two is that the first dichroic unit 3142 and the second dichroic unit 3144 in the present embodiment are disposed differently as those illustrated in FIG. 4. As shown in FIG. 5, the reflection mirror 3160 is capable of reflecting the first color light beam L2 to the first dichroic unit 3142. The first dichroic unit 3142 is disposed on the transmission paths P2 and P3 of the first color light beam L2 and the second color light beam L3. The first dichroic unit 3142 is capable of reflecting one of the first color light beam L2 and the second color light beam L3 and allowing the other one of the first color light beam L2 and the second color light beam L3 to pass through. Besides, the first dichroic unit 3142 combines the transmission paths P2 and P3 of the first color light beam L2 and the second color light beam L3. To be specific, in the present embodiment, the first dichroic unit 3142 is capable of reflecting the second color light beam L3 and allowing the first color light beam L2 to pass through. In another embodiment, the positions of the first light emitting element 1110 and the wavelength conversion unit 2120 may be exchanged with that of the second light emitting element 1130 so that the first dichroic unit 3142 becomes capable of reflecting the first color light beam L2 converted by the wavelength conversion unit 2120 and letting the second color light beam L3 to pass through.

On the other hand, in the present embodiment, the second dichroic unit 3144 is disposed on the transmission path P4 of the third color light beam L4 and on the combined transmission paths P2 and P3 of the first color light beam L2 and the second color light beam L3. As shown in FIG. 5, the second dichroic unit 3144 is capable of reflecting the third color light beam L4 and allowing the first color light beam L2 and the second color light beam L3 to pass through so as to combine the transmission paths P2, P3, and P4 of the first color light beam L2, the second color light beam L3, and the third color light beam L4. A color image is produced after the first color light beam L2, the second color light beam L3, and the third color light beam L4 pass through the light valve 1200.

Additionally, in other embodiments, the positions of the first light emitting element 1110 and the wavelength conversion unit 2120 may also be exchanged with that of the third light emitting element 1150. In this case, the first dichroic unit 3142 is disposed on the transmission paths P3 and P4 of the second color light beam L3 and the third color light beam L4, the first dichroic unit 3142 is capable of reflecting one of the second color light beam L3 and the third color light beam L4 and allowing the other one of the second color light beam L3 and the third color light beam L4 to pass through, and the first dichroic unit 3142 combines the transmission paths P3 and P4 of the second color light beam L3 and the third color light beam L4.

If the positions of the first light emitting element 1110 and the wavelength conversion unit 2120 are exchanged with that of the third light emitting element 1150, the second dichroic unit 3144 is disposed on the transmission path P2 of the first color light beam L2 and on the combined transmission paths P3 and P4 of the second color light beam L3 and the third color light beam L4, wherein the second dichroic unit 3144 is capable of reflecting the first color light beam L2 and allowing the second color light beam L3 and the third color light beam L4 to pass through.

Sixth Embodiment

Figure 6:
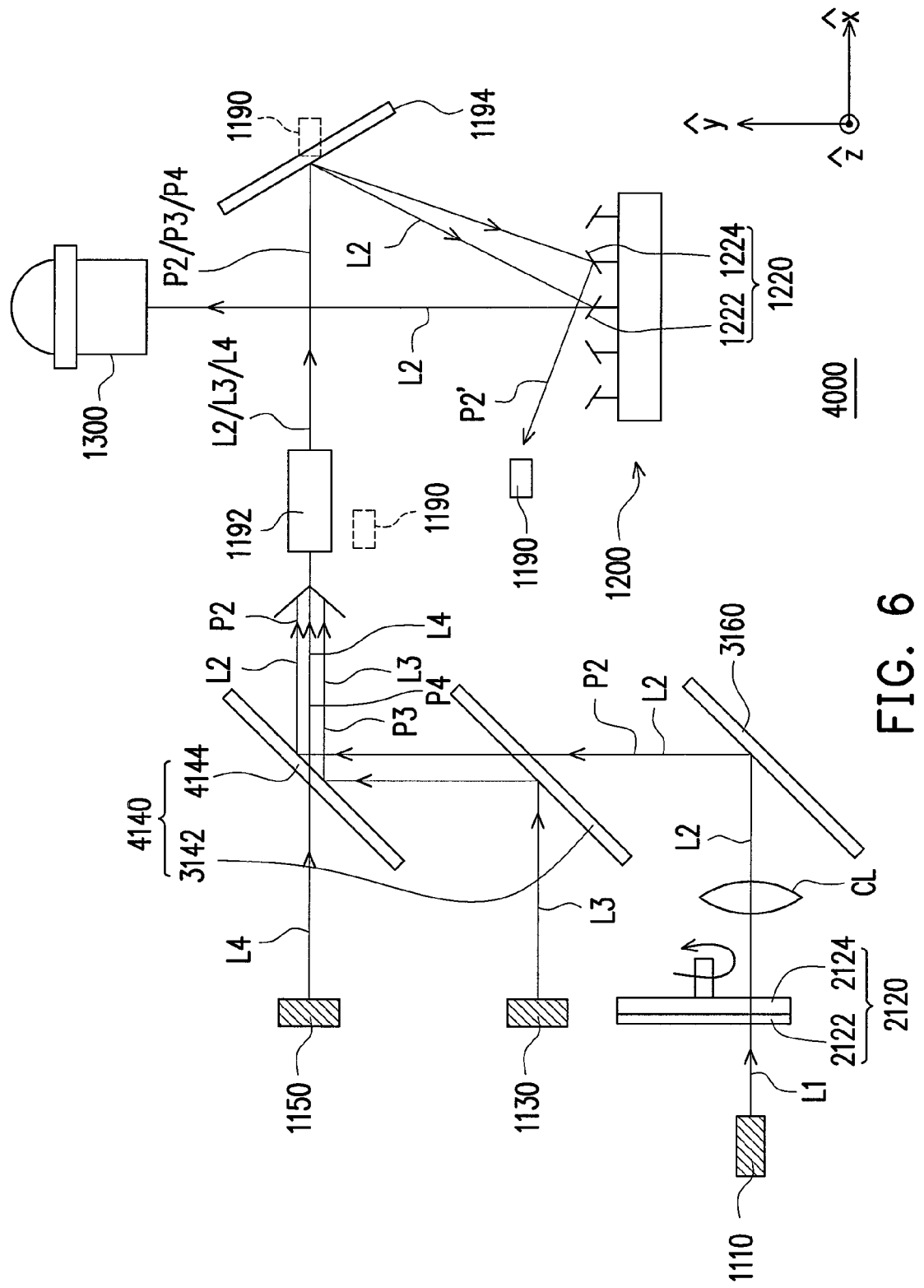
FIG. 6 is a light path diagram of a projection apparatus according to a sixth embodiment of the invention.

FIG. 6 is a light path diagram of a projection apparatus 4000 according to the sixth embodiment of the invention. The projection apparatus 4000 in the present embodiment is similar to the projection apparatus 3000 in FIG. 5, and the major difference between the two is that the second dichroic unit 4144 in the present embodiment is capable of reflecting the first color light beam L2 and the second color light beam L3 and allowing the third color light beam L4 to pass through so as to combine the transmission paths P2, P3, and P4 of the first color light beam L2, the second color light beam L3, and the third color light beam L4. A color image is produced after the first color light beam L2, the second color light beam L3, and the third color light beam L4 pass through the light valve 1200.

In other embodiments, the positions of the first light emitting element 1110 and the wavelength conversion unit 2120 may also be exchanged with that of the third light emitting element 1150. In this case, the second dichroic unit 4144 is capable of reflecting the second color light beam L3 and the third color light beam L4 and allowing the first color light beam L2 to pass through so as to combine the transmission paths P2, P3, and P4 of the first color light beam L2, the second color light beam L3, and the third color light beam L4.

Seventh Embodiment

Figure 7:
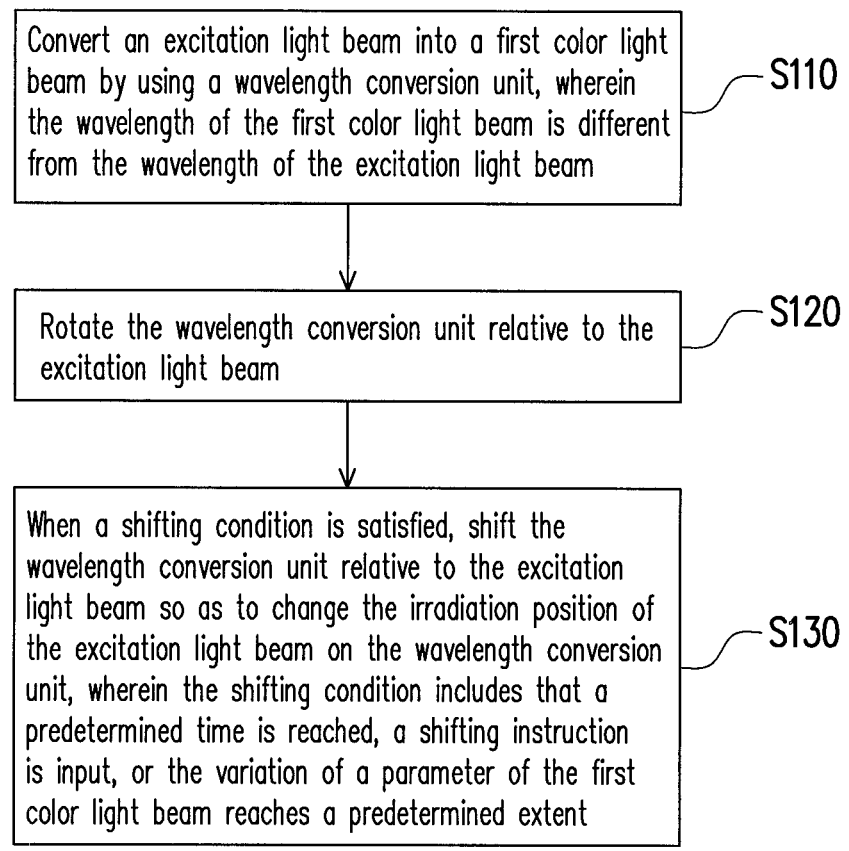
FIG. 7 is a flowchart of a light source control method according to a seventh embodiment of the invention.

FIG. 7 is a flowchart of a light source control method according to the seventh embodiment of the invention. The light source control method in the present embodiment could be applied to the illumination modules and projection apparatuses illustrated in FIGS. 1A-1C, FIG. 2, and FIG. 3. Referring to FIG. 1A, FIG. 1B, and FIG. 7, first, the excitation light beam L1 is converted by the wavelength conversion unit 1120 into the first color light beam L2, wherein the wavelength of the first color light beam L2 is different from that of the excitation light beam L1 (step S110). Then, the wavelength conversion unit 1120 is rotated relative to the excitation light beam L1 (step S120). Next, when a shifting condition is satisfied, the wavelength conversion unit 1120 is shifted relative to the excitation light beam L1 to change the irradiation position of the excitation light beam L1 on the wavelength conversion unit 1120, wherein the shifting condition includes that a predetermined time is reached, a shifting instruction is input, or the variation of a parameter of the first color light beam L2 reaches a predetermined extent (step S130). In the present embodiment, the wavelength conversion unit 1120 may be shifted by the control unit 1170 relative to the excitation light beam L1, and whether the shifting condition is satisfied may be determined by the determining unit 1180. However, the implementation details could be referred to the first embodiment described above therefore will not be described herein.

Additionally, in another embodiment, following steps may be further executed between step S120 and step S130. For example, the first color light beam L2 is first detected. Then, the parameter of the first color light beam L2 is calculated, and whether the variation of the parameter reaches the predetermined extent is determined, wherein the wavelength conversion unit 1120 is shifted relative to the excitation light beam L1 when the variation of the parameter reaches the predetermined extent. In the present embodiment, the first color light beam L2 may be detected by the light detector 1190, and whether the variation of the parameter reaches the predetermined extent may be determined by the calculation and comparison unit 1182. However, the implementation details could be referred to the first embodiment described above therefore will not be described herein.

Or, following steps may be executed between step S120 and step S130. For example, the first color light beam L2, the second color light beam L3, and the third color light beam L4 are first detected, wherein the parameter of the first color light beam L2 is the proportion of the light intensity of the first color light beam L2 to the light intensity of the second color light beam L3 and the light intensity of the third color light beam L4. Then, when the proportion between the light intensities of the first color light beam L2, the second color light beam L3, and the third color light beam L4 exceeds the predetermined range, the light intensities of the first color light beam L2, the second color light beam L3, and the third color light beam L4 are adjusted so that the proportion between the light intensities of the first color light beam L2, the second color light beam L3, and the third color light beam L4 may fall within the predetermined range. In the present embodiment, the first color light beam L2 may be detected by the light detector 1190, and whether the variation of the parameter reaches the predetermined extent may be determined by the calculation and comparison unit 1182. However, the implementation details could be referred to the first embodiment described above therefore will not be described herein.

The light source control method in the present embodiment could be referred to the embodiment illustrated in FIGS. 1A-1C therefore will not be described herein.

Eighth Embodiment

Figure 8:
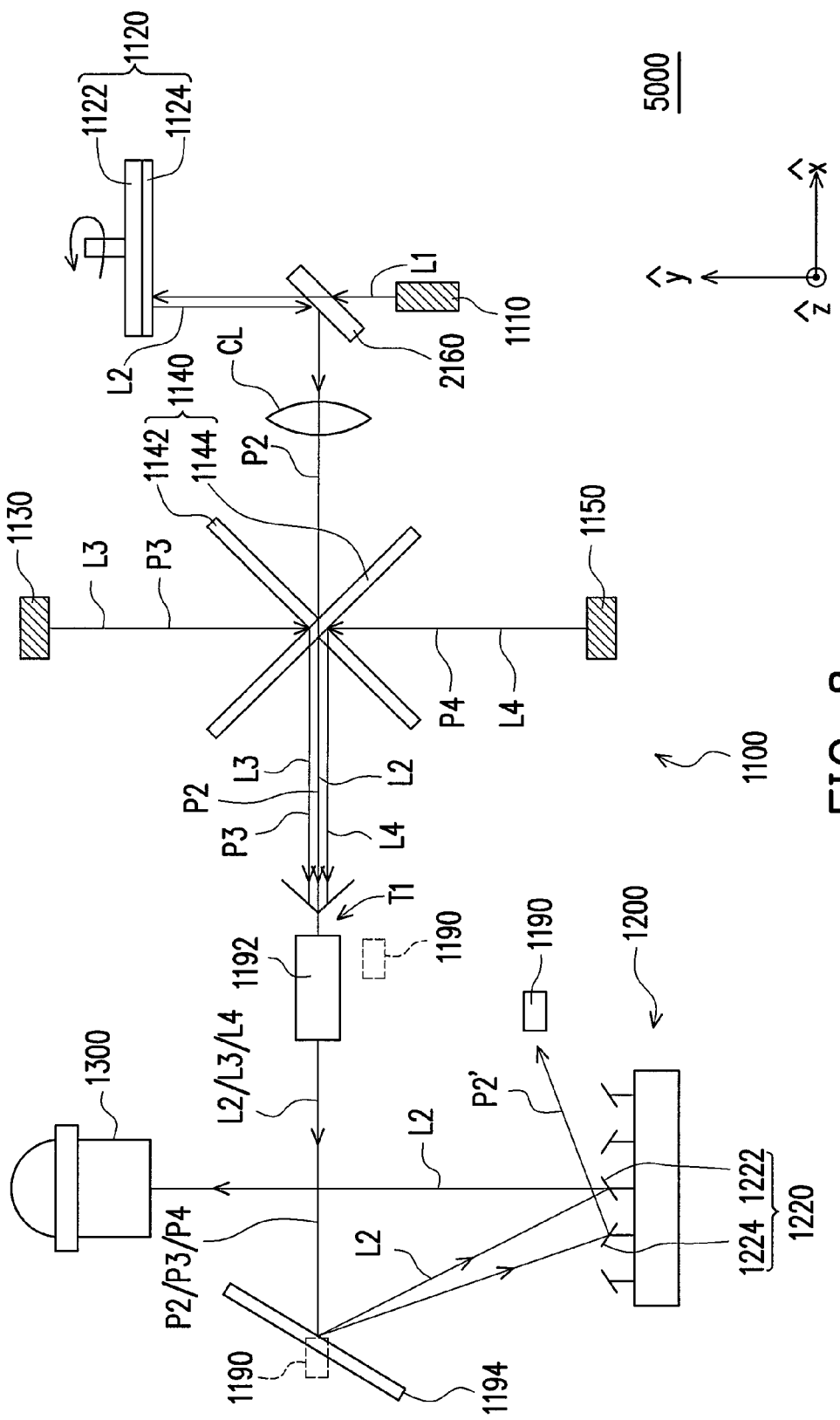
FIG. 8 is a light path diagram of a projection apparatus according to an eighth embodiment of the invention.

FIG. 8 is a light path diagram of a projection apparatus 5000 according to the eighth embodiment of the invention. The projection apparatus 5000 in the present embodiment is similar to the projection apparatus 1000 in FIG. 1A, and the major difference between the two is that the third dichroic unit 2160 in the present embodiment is capable of reflecting the first color light beam L2 and allowing the excitation light beam L1 to pass through, so that the transmission paths P2, P3, and P4 of the first color light beam L2, the second color light beam L3, and the third color light beam L4 are combined after they pass through the light combination element 1140. A color image is produced after the first color light beam L2, the second color light beam L3, and the third color light beam L4 pass through the light valve 1200.

Ninth Embodiment

Figure 9:
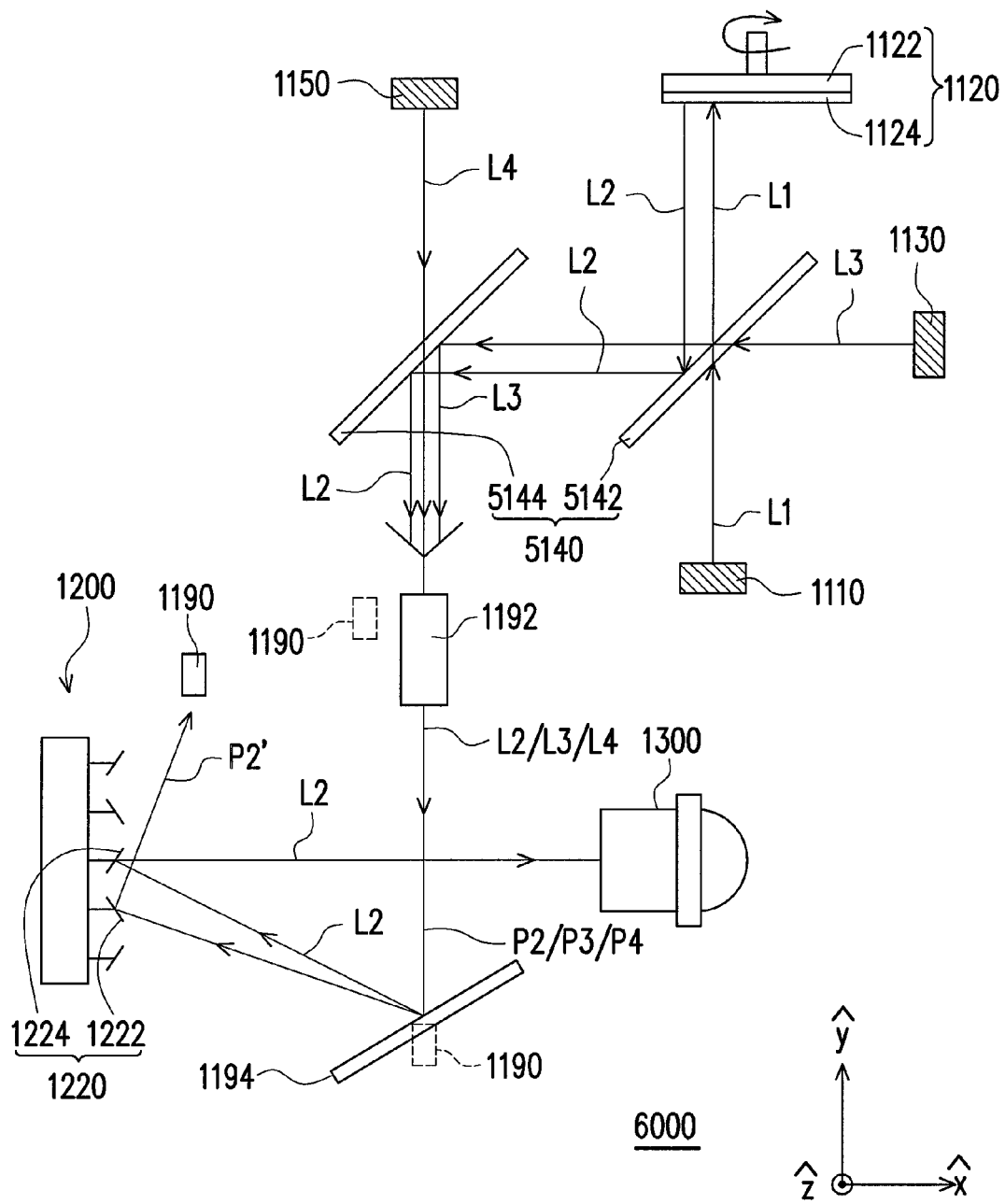
FIG. 9 is a light path diagram of a projection apparatus according to a ninth embodiment of the invention.

FIG. 9 is a light path diagram of a projection apparatus 6000 according to the ninth embodiment of the invention. The projection apparatus 6000 in the present embodiment is similar to the projection apparatus 4000 in FIG. 6, and the major difference between the two is that the first dichroic unit 5142 in the present embodiment is capable of reflecting the first color light beam L2 and allowing the excitation light beam L1 and the second color light beam L3 to pass through. Besides, the second dichroic unit 5144 is capable of reflecting the first color light beam L2 and the second color light beam L3 and allowing the third color light beam L4 to pass through, so as to combine the transmission paths P2, P3, and P4 of the first color light beam L2, the second color light beam L3, and the third color light beam L4. A color image is produced after the first color light beam L2, the second color light beam L3, and the third color light beam L4 pass through the light valve 1200.

In summary, embodiments of the invention may include at least one of following advantages or functions. In an embodiment of the invention, a wavelength conversion unit produces an intensive first color light beam through excitation. In addition, because the wavelength conversion unit is capable of rotating and shifting relative to an excitation light beam through automatic control or manual adjustment, the excitation light beam may irradiate at different position on the wavelength conversion unit at different time point. Thereby, damaged caused by heat accumulation within a specific area on the wavelength conversion unit is avoided, and a stable light beam could be produced so that the projection quality of a projection apparatus is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

Finally, in the embodiments of the invention described above, when the first light emitting element, the second light emitting element and the third light emitting element, or the like, are operated, the first color light beam, the second color light beam, and the third color light beam can be combined into a white light beam. Moreover, when the first light emitting element, the second light emitting element, and the third light emitting element are alternately and quickly turned on/off, and after the first color light beam, the second color light beam, and the third color light beam are alternately incident to the light combination element, a color image can be generated based on a visual persistence effect of human eyes. Therefore, when the invention mentions that "the light combination element for combining the first color light beam and second color light beam" or the like, it means that the first color light beam and second color light beam may be or not be incident to the light combine element simultaneously or at the same time. In other words, even the first color light beam is incident to the light combination element first and then following the second color light beam is incident to the light combination element, so that the first color light beam and the second color light beam propagate along the same transmission path after the first color light beam and second color light beam are passed through the light combination element (e.g. transmission through the light combination element or refection by the light combination element), it is still within the scope of "the light combination element combining the first color light beam and the second color light beam" or the like.

What is claimed is:

1. An illumination module, comprising:
a first light emitting element, capable of emitting an excitation light beam;
a wavelength conversion unit, disposed on a transmission path of the excitation light beam, for converting the excitation light beam into a first color light beam, wherein a wavelength of the first color light beam is different from a wavelength of the excitation light beam;
a control unit, connected to the wavelength conversion unit, wherein the control unit is capable of driving the wavelength conversion unit to rotate and driving the wavelength conversion unit to shift relative to the excitation light beam; and
a determining unit, electrically connected to the control unit, wherein when the determining unit determines that a shifting condition is satisfied, the determining unit instructs the control unit to shift the wavelength conversion unit relative to the excitation light beam, so as to change an irradiation position of the excitation light beam on the wavelength conversion unit,
wherein the wavelength conversion unit is shifted to change a distance from the irradiation position of the excitation light beam on the wavelength conversion unit to a rotation center of the wavelength conversion unit.

2. The illumination module according to claim 1, further comprising:
a second light emitting element, capable of emitting a second color light beam;
a third light emitting element, capable of emitting a third color light beam;
a light detector, disposed on transmission paths of the first color light beam, the second color light beam, and the third color light beam; and
a color adjustment unit, electrically connected to the first light emitting element, the second light emitting element, the third light emitting element, the light detector, and the determining unit, wherein when the determining unit instructs the control unit to shift the wavelength conversion unit relative to the excitation light beam and the color adjustment unit determines that a proportion of the light intensities of the first color light beam, the second color light beam, and the third color light beam detected by the light detector exceeds a predetermined range, the color adjustment unit adjusts the light intensities of the first color light beam, the second color light beam, and the third color light beam so that the proportion of the light intensities of the first color light beam, the second color light beam, and the third color light beam falls within the predetermined range.

3. The illumination module according to claim 1, wherein the wavelength conversion unit comprises a phosphor layer, and the excitation light beam is capable of exciting the phosphor layer so as to allow the phosphor layer to emit the first color light beam.

4. The illumination module according to claim 3, wherein the wavelength conversion unit further comprises a light transparent substrate, and the phosphor layer is disposed on the light transparent substrate.

5. The illumination module according to claim 3, wherein the wavelength conversion unit further comprises a reflection mirror, and the phosphor layer is disposed on the reflection mirror.

6. The illumination module according to claim 1, wherein the shifting condition comprises that a predetermined time is reached, a shifting instruction is input, or a variation of a parameter of the first color light beam reaches a predetermined extent.

7. The illumination module according to claim 6, wherein the determining unit comprises a timer electrically connected to the control unit, the timer calculates a working time of the wavelength conversion unit, and when the working time of the wavelength conversion unit reaches the predetermined time, the timer instructs the control unit to shift the wavelength conversion unit relative to the excitation light beam.

8. The illumination module according to claim 6, further comprising a light detector disposed on a transmission path of the first color light beam, wherein the light detector detects the first color light beam, the determining unit comprises a calculation and comparison unit electrically connected to the light detector and the control unit, and the calculation and comparison unit calculates the parameter of the first color light beam captured from the light detector and determines whether the variation of the parameter reaches the predetermined extent, wherein when the variation of the parameter reaches the predetermined extent, the calculation and comparison unit instructs the control unit to shift the wavelength conversion unit relative to the excitation light beam.

9. The illumination module according to claim 8, wherein the parameter is a light intensity of the first color light beam.

10. The illumination module according to claim 8, further comprising:
a second light emitting element, capable of emitting a second color light beam;
a third light emitting element, capable of emitting a third color light beam; and
a light combination element, disposed on transmission paths of the first color light beam, the second color light beam, and the third color light beam, for combining the first color light beam, the second color light beam, and the third color light beam, wherein the light detector is also disposed on the transmission paths of the second color light beam and the third color light beam for detecting the second color light beam and the third color light beam, and the parameter of the first color light beam is a proportion of the light intensity of the first color light beam to a light intensity of the second color light beam and a light intensity of the third color light beam.

11. The illumination module according to claim 6, wherein the determining unit comprises a user interface electrically connected to the control unit, and when the shifting instruction is input into the user interface, the user interface instructs the control unit to shift the wavelength conversion unit relative to the excitation light beam.

12. The illumination module according to claim 11, wherein the determining unit further comprises a timer electrically connected to the user interface, the timer calculates a working time of the wavelength conversion unit, and when the working time of the wavelength conversion unit reaches the predetermined time, the timer outputs a notification instruction to notify a user to input the shifting instruction into the user interface.

13. A projection apparatus, comprising:
an illumination module, comprising:
a first light emitting element, capable of emitting an excitation light beam;
a wavelength conversion unit, disposed on a transmission path of the excitation light beam for converting the excitation light beam into a first color light beam, wherein a wavelength of the first color light beam is different from a wavelength of the excitation light beam;
a control unit, connected to the wavelength conversion unit, wherein the control unit is capable of driving the wavelength conversion unit to rotate and driving the wavelength conversion unit to shift relative to the excitation light beam;
a determining unit, electrically connected to the control unit, wherein when the determining unit determines that a shifting condition is satisfied, the determining unit instructs the control unit to shift the wavelength conversion unit relative to the excitation light beam, so as to change an irradiation position of the excitation light beam on the wavelength conversion unit;
a second light emitting element, capable of emitting a second color light beam; and
a light combination element, disposed on transmission paths of the first color light beam and the second color light beam, for combining the first color light beam and the second color light beam;
a light valve, disposed on the transmission paths of the first color light beam and the second color light beam; and
a projection lens, disposed on the transmission paths of the first color light beam and the second color light beam coming from the light valve,
wherein the wavelength conversion unit is shifted to change a distance from the irradiation position of the excitation light beam on the wavelength conversion unit to a rotation center of the wavelength conversion unit.

14. The projection apparatus according to claim 13, wherein the light valve is a digital micro-mirror device (DMD), and the DMD comprises a plurality of micro reflection mirrors, each of the micro reflection mirrors is capable of rotating to an on-state and an off-state, wherein when the micro reflection mirror swings to the on-state, the micro reflection mirror reflects the first color light beam radiated onto the micro reflection mirror to the projection lens, and when the micro reflection mirror swings to the off-state, the micro reflection mirror reflects the first color light beam radiated onto the micro reflection mirror to a direction deviating from the projection lens, and the light detector is disposed on the transmission path of the first color light beam reflected by the micro reflection mirrors when the micro reflection mirrors are in the off-state.

15. The projection apparatus according to claim 13, further comprising a reflection element disposed between the light combination element and the light valve, the reflection element reflects the first color light beam coming from the light combination element to the light valve, and a light detector is disposed around the reflection element for detecting a stray light produced when the first color light beam is reflected to the light valve.

16. The projection apparatus according to claim 13, further comprising a light unifommzation element disposed between the light combination element and the light valve, wherein a light detector is disposed around the light uniformization element for detecting a stray light produced by the first color light beam.

17. The projection apparatus according to claim 13, wherein the shifting condition comprises that a predetermined time is reached, a shifting instruction is input, or a variation of a parameter of the first color light beam reaches a predetermined extent.

18. The projection apparatus according to claim 17, wherein the determining unit comprises a timer electrically connected to the control unit, the timer calculates a working time of the wavelength conversion unit, and when the working time of the wavelength conversion unit reaches the predetermined time, the timer instructs the control unit to shift the wavelength conversion unit relative to the excitation light beam.

19. The projection apparatus according to claim 17, wherein the determining unit comprises a user interface electrically connected to the control unit, and when the shifting instruction is input into the user interface, the user interface instructs the control unit to shift the wavelength conversion unit relative to the excitation light beam.

20. The projection apparatus according to claim 19, wherein the determining unit further comprises a timer electrically connected to the user interface, the timer calculates a working time of the wavelength conversion unit, and when the working time of the wavelength conversion unit reaches the predetermined time, the timer outputs a notification instruction to notify a user to input the shifting instruction into the user interface.

21. The projection apparatus according to claim 17, further comprising a light detector disposed on the transmission path of the first color light beam, wherein the light detector detects the first color light beam, the determining unit comprises a calculation and comparison unit electrically connected to the light detector and the control unit, and the calculation and comparison unit calculates the parameter of the first color light beam captured from the light detector and determines whether the variation of the parameter reaches the predetermined extent, wherein when the variation of the parameter reaches the predetermined extent, the calculation and comparison unit instructs the control unit to shift the wavelength conversion unit relative to the excitation light beam.

22. The projection apparatus according to claim 21, wherein the parameter is a light intensity of the first color light beam.

23. The projection apparatus according to claim 21, further comprising a third light emitting element, wherein the third light emitting element is capable of emitting a third color light beam, and the light combination element is disposed on a transmission path of the third color light beam for combining the first color light beam, the second color light beam, and the third color light beam.

24. The projection apparatus according to claim 23, wherein the light detector is also disposed on the transmission paths of the second color light beam and the third color light beam for detecting the second color light beam and the third color light beam, and the parameter of the first color light beam is a proportion of the light intensity of the first color light beam to a light intensity of the second color light beam and a light intensity of the third color light beam.

25. The projection apparatus according to claim 23, further comprising:

the light detector, disposed on the transmission paths of the first color light beam, the second color light beam, and the third color light beam; and a color adjustment unit, electrically connected to the first light emitting element, the second light emitting element, the third light emitting element, the light detector, and the determining unit, wherein when the determining unit instructs the control unit to shift the wavelength conversion unit and the color adjustment unit determines that a proportion of the light intensities of the first color light beam, the second color light beam, and the third color light beam detected by the light detector exceeds a predetermined range, the color adjustment unit adjusts the light intensities of the first color light beam, the second color light beam, and the third color light beam so that the proportion of the light intensities of the first color light beam, the second color light beam, and the third color light beam falls within the predetermined range.

26. A light source control method, comprising:
converting an excitation light beam into a first color light beam by using a wavelength conversion unit, wherein a wavelength of the first color light beam is different from a wavelength of the excitation light beam;
rotating the wavelength conversion unit relative to the excitation light beam; and
when a shifting condition is satisfied, shifting the wavelength conversion unit relative to the excitation light beam so as to change an irradiation position of the excitation light beam on the wavelength conversion unit,
wherein the wavelength conversion unit is shifted to change a distance from the irradiation position of the excitation light beam on the wavelength conversion unit to a rotation center of the wavelength conversion unit.

27. The light source control method according to claim 26, wherein the shifting condition comprises that a predetermined time is reached, a shifting instruction is input, or a variation of a parameter of the first color light beam reaches a predetermined extent.

28. The light source control method according to claim 27, further comprising shifting the wavelength conversion unit relative to the excitation light beam after the wavelength conversion unit works for the predetermined time.

29. The light source control method according to claim 27, further comprising receiving the shifting instruction by using a user interface, wherein the user interface instructs the control unit to shift the wavelength conversion unit when the shifting instruction is input.

30. The light source control method according to claim 27, further comprising:
detecting the first color light beam, a second color light beam, and a third color light beam, wherein the parameter of the first color light beam is a proportion of the light intensity of the first color light beam to a light intensity of the second color light beam and a light intensity of the third color light beam; and
when the proportion of the light intensities of the first color light beam, the second color light beam, and the third color light beam exceeds a predetermined range, adjusting the light intensities of the first color light beam, the second color light beam, and the third color light beam so that the proportion of the light intensities of the first color light beam, the second color light beam, and the third color light beam falls within the predetermined range.

31. The light source control method according to claim 27, further comprising:

detecting the first color light beam; and calculating the parameter of the first color light beam and determining whether the variation of the parameter reaches the predetermined extent, wherein the wavelength conversion unit is shifted relative to the excitation light beam when the variation of the parameter reaches the predetermined extent.

32. The light source control method according to claim 31, wherein the parameter is a light intensity of the first color light beam.

* * * * *